Patent Number: 5,046,870
Date of Patent: Sep. 10, 1991

[54] END PLAY AND PRELOAD ADJUSTING ASSEMBLY FOR TAPERED BEARINGS

[75] Inventor: James P. Ordo, Plainfield, Ind.

[73] Assignee: General Motors Corporation, Detroit, Mich.

[21] Appl. No.: 562,494

[22] Filed: Aug. 2, 1990

[51] Int. Cl.⁵ ............................................. F16C 23/06
[52] U.S. Cl. ..................................... 384/563; 384/583
[58] Field of Search ............... 384/583, 563, 538, 519, 384/255

[56] References Cited

U.S. PATENT DOCUMENTS

| | | | |
|---|---|---|---|
| 3,746,412 | 7/1973 | Hay | 384/563 |
| 3,901,568 | 8/1975 | Gadd et al. | |
| 3,966,282 | 6/1976 | Overton | |
| 4,611,934 | 9/1986 | Piotrowski et al. | 384/519 |
| 4,613,240 | 9/1986 | Hagelthorn | 384/583 |

Primary Examiner—Lenard A. Footland
Attorney, Agent, or Firm—Donald F. Scherer

[57] ABSTRACT

An assembly (10) by which to effect incremental adjustments to the end play, or preloading, to a bearing set (12). Relatively rotatable first and second ring means (25 and 35) have contiguously juxtaposed and interacting ramp surfaces (29 and 36). In addition, the first ring means is operatively secured to the housing (14) in which the bearing set is supported in such a manner as to preclude rotation of the first ring means (25) with respect to the housing (14). A tang (30) presented from the first ring means (25) may interact with a slot (31) in the housing (14) to secure the first ring means (25) against rotation. The second ring means (35) is selectively rotatable with respect to the first ring means (25) to effect axial translation of the first ring means (25) by virtue of the interaction between said opposed, contiguously juxtaposed ramp surfaces (53) and 54). A latch plate (40) is disposed in proximity to the second ring means (35), and a tang (41) is also operative between the latch plate (40) and the housing (14) tro preclude rotation of the latch plate (40). A vernier locking means (45) is incrementally interactive between the latch plate (40) and the second ring means (35) selectively to secure the second ring means (35) against rotation and thereby secure the first lock ring (25) against axial translation.

11 Claims, 2 Drawing Sheets

END PLAY AND PRELOAD ADJUSTING ASSEMBLY FOR TAPERED BEARINGS

TECHNICAL FIELD

The present invention relates to bearing mounts. More particularly, the present invention relates to a simplified adjustment assembly which interacts between a bearing assembly and the housing within which the bearing assembly is supported. Specifically, the present invention relates to an assembly by which to effect incremental adjustments to the axial end play of, or the preload on, the outer race of a bearing assembly, either alone or in a set.

BACKGROUND OF THE INVENTION

Even with journal arrangements for which thrust loading is not reasonably anticipated, and within which cylindrical bearings are appropriate to support radial loading, it is customary to utilize some structure by which to effect axial retention of the bearings that rotatably support a shaft, or the like. This is done so that should the shaft, even unexpectedly, apply a reasonable thrust load on the bearing, the bearing will remain seated within the housing. When the environment in which the journal arrangement is employed is such that both radial and thrust loading would be expected, one would generally consider the use of tapered bearing sets inasmuch as they effect excellent rotational support for a shaft subjected to such loading and without impairing rotation of the shaft. However, other alternatives are often employed because of the difficulties heretofore experienced in adjusting the axial end play of, or the preload on, the races which support the rollers in a tapered bearing assembly.

Thrust loading is transferred by the individual bearing assemblies in a tapered bearing set from the shaft to the journal box or housing, within which the bearings of the bearing set are supported. Generally, the inner race of each bearing assembly abuts a shoulder presented from the rotatable shaft. The outer race similarly abuts an opposed shoulder presented from the housing in which the bearing is supported. Obviously, the structure which presents the opposed shoulders between which the bearing set is captured, must be such as to permit assembly of the shaft and both bearing assemblies into the housing. Moreover, even if opposed, rigid shoulders could be provided, such an arrangement would not allow for any variation or adjustment in the end play of, or the preloading applied to, the bearing set.

To facilitate assembly, some arrangements (such as those wherein the hub of an axially elongated shaft is supported by inboard and outboard bearing assemblies) utilize the aforesaid configuration for the inboard bearing — i.e., the inner race abuts a shoulder on the shaft and the outer race abuts a shoulder on the housing — but reverses the arrangement for the outboard bearing. That is, the outer race of the outboard bearing would abut a shoulder on the housing and the inner race would abut a shoulder means presented from the shaft. In this latter arrangement, adjustment of the preload and the end play has been achieved by using a nut threaded onto the shaft to drive a washer which serves as the shoulder means. In this configuration, the washer abuts the inner race and the nut can be tightened or loosened to move the washer and thereby adjust the preload and end play.

It is, however, difficult to achieve and maintain incremental adjustments of the small magnitude desired by using a nut threaded onto the end of the shaft. Certainly, such nuts are often crenelated to permit a safety wire or clip to be inserted through a diametric bore in the shaft in order to secure the selected position of the nut. However, the magnitude of the adjustments permitted by the aforesaid arrangement is limited to a function of the thread pitch and the number of crenelations as well as their angular disposition.

To accomplish incremental adjustments of a small or fine magnitude, a variety of arrangements have been developed which utilize shims interposed between one race of the bearing set and a bearing retainer. The shims utilized by such prior art assemblies are available in a plurality of dimensions so that the selection of appropriately sized shims will generally achieve the desired end play or preloading. However, the installation of a typical shim assembly generally requires a rather complicated series of steps. For example, one must normally measure the gap between one race of the bearing assembly and the bearing retainer to determine the size of the shim or shims required, and the shim or a combination of shims must then be selected. The selected shim(s) must then be appropriately inserted between the selected race of the bearing assembly and the bearing retainer. The installation is not concluded until a final measurement has been made to verify that the proper end play and preloading has been achieved.

The installation of prior known shim assemblies is, therefore, a relatively complicated process for which considerable expertise is required, and for which shims must be available in a wide variety of sizes in order for the desired end play or preloading to be effected.

Another form of a prior art bearing adjusting assembly employs opposed cams or ramps. The use of cams or ramps allows for a wide range in the amount of end play or preloading adjustment available and reduces the number of components which must be stocked. However, the locking means heretofore employed in conjunction with cams or ramps to secure the selected adjustment, generally comprises a plurality of bolts that are receivable within threaded bores. The need to provide threaded bores, however, creates a problem in that while the aforementioned cams or ramps will allow for an infinite array of settings, discrete placement of threaded bores to receive the bolts severely restricts usage of the array to that permitted by the particular placement of the bores.

SUMMARY OF THE INVENTION

It is, therefore, a primary object of the present invention to provide a simplified assembly by which to effect incremental adjustments to the end play of, and the preload on, a bearing set.

It is another object of the present invention to provide an adjusting assembly, as above, which incorporates a relatively uncomplicated arrangement by which to secure the selected end play and preload, by moving the bearing race upon which the adjusting assembly acts through dimensional increments measured in thousandths of an inch or less.

It is a further object of the present invention to provide an adjusting assembly, as above, which does not require stocking a plurality of different size shims.

It is still another object of the present invention to provide an adjusting assembly, as above, which assures that the selected end play and preloading will be maintained, and which can thereafter be further adjusted as necessary or desired, with relative ease.

It is yet another object of the present invention to provide an adjusting assembly which permits the desired preload for a bearing set to be exceeded in order to seat the bearing set correctly, and which thereafter permits the preload to be progressively released until the desired end play has been established.

These and other objects of the invention, as well as the advantages thereof over existing and prior art forms which will be apparent in view of the following detailed specification, are accomplished by means hereinafter described and claimed.

In general, an assembly embodying the concepts of the present invention allows a mechanic, or the entity repairing or originally assembling a bearing set within a support housing, to effect incremental adjustments to the end play of, or the preloading on, the bearing set. In a preferred embodiment of the invention the adjusting assembly utilizes first and second ring means. The first and second ring means have contiguously juxtaposed and interacting ramp surfaces. The first ring means is operatively secured or grounded to the housing in an appropriate manner which precludes rotation thereof with respect to the housing, but which permits axial translation thereof with respect to the housing.

The second ring means is selectively rotatable with respect to the first ring means and a latch plate is disposed in proximity to the second ring means. Grounding means are also operative between the latch plate and the housing to preclude rotation of the latch plate. A vernier locking means is incrementally interactive between the latch plate and the second ring means selectively to secure the second ring means against rotation.

In a preferred embodiment, the vernier locking means employs a plurality of locking pawls which are presented from the latch plate, and a plurality of interdental receiving recesses which are presented from the second ring to embrace whichever locking pawl aligns with one of the interdental receiving recesses. To effect the desired result, the locking pawls and the interdental receiving recesses are disposed in a vernier relation in order to permit the second ring to be secured at selected rotational dispositions in order to position the first ring, in turn, at incremental axial translations.

One exemplary adjusting assembly embodying the concepts of the present invention is disclosed in operative combination with a tapered bearing set. The description of that embodiment is deemed sufficient to effect a full disclosure of the subject invention, the exemplary embodiment being shown by way of example in the accompanying drawings and being described in detail without attempting to show all the various forms and modifications in which the invention might be embodied — the invention being measured by the appended claims and not by the details of the specifications.

DESCRIPTION OF AN EXEMPLARY EMBODIMENT

Figure 1:
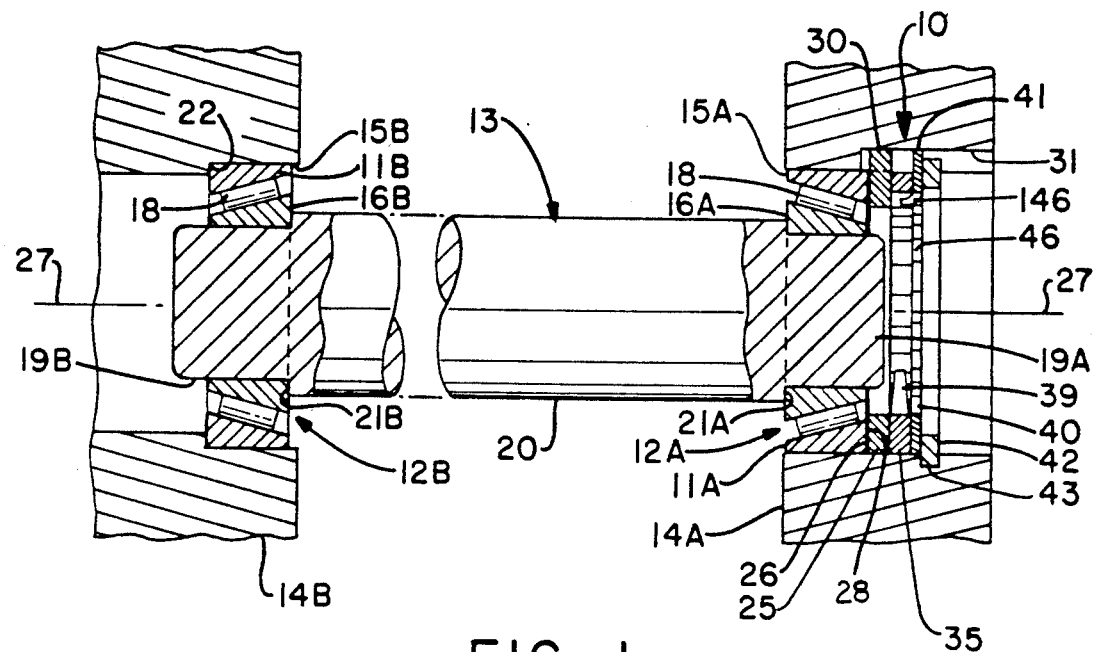
FIG. 1 is a longitudinal cross section taken substantially along the axis of a shaft rotatably supported in a pair of spaced tapered bearings that are, in turn, supported from spaced housings, one of which incorporates the structure of an exemplary form of adjustment assembly embodying the concepts of the present invention.
Figure 2:
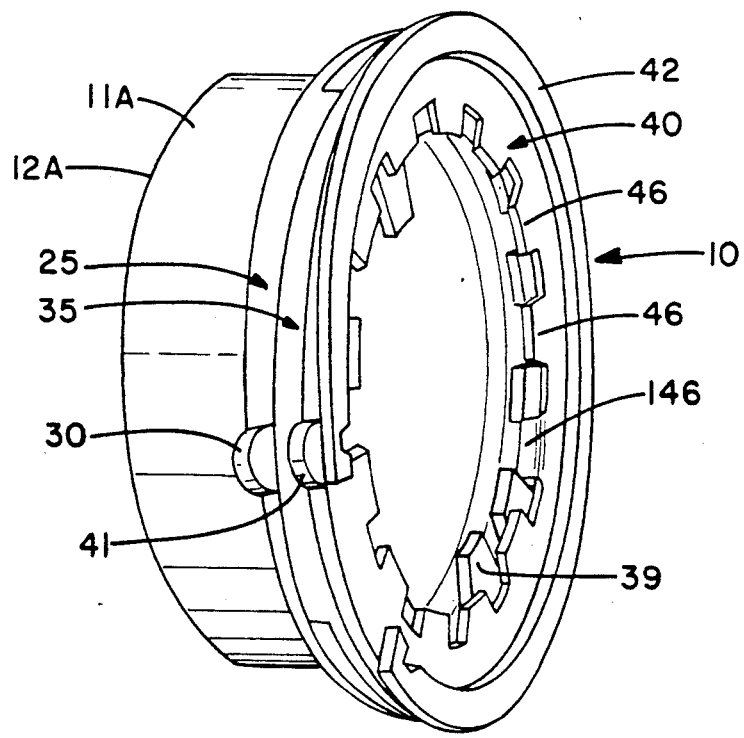
FIG. 2 is an enlarged perspective of an outer race depicted in conjunction with the adjustment assembly, and in the same relative disposition, as depicted in FIG. 1.

One representative form of an adjusting assembly embodying the concepts of the present invention is designated generally by the numeral 10 on the accompanying drawings. The representative adjusting assembly 10 is depicted in operative association with one of the outer races 11 of a tapered bearing set 12. The bearing set 12 includes a pair of spaced bearing assemblies 12A and 12B by which a shaft 13 is rotatably supported between two spaced housings 14A and 14B. The bearing assemblies 12A and 12B are received within the respective apertures 15A and 15B circumscribed by the respective housings 14A and 14B.

As may be apparent from the previous paragraph, and as utilized in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there is a bearing set which is generally identified by the numeral 12, but the specific, individual bearing assemblies are, therefore, identified as 12A and 12B in the specification and on the drawings. This same suffix convention shall be employed throughout the specification.

In addition to an outer race 11, each bearing assembly 12A and 12B is also provided with an inner race 16, and the tapered rollers 18 in each bearing assembly are disposed between the outer and inner races 11 and 16, respectively. A journal portion 19 is provided at each end of the shaft 13, and the journal portions 19A and 19B are of lesser outer diameter than the body portion 20 of the shaft 13 in order to define a shoulder 21A and 21B between the respective journal portions 19A and 19B and the body portion 20 of the shaft 13.

When a shaft 13 is supported by spaced journals 19A and 19B, as depicted in FIG. 1, a shoulder 22 may be machined into the housing 14B to engage the outer race 11B of the bearing assembly 12B. In the environment depicted, only one adjusting assembly 10 need be employed, and that adjusting assembly 10 may be operative between the housing 14A and the bearing assembly 12A. As will become apparent, the adjusting assembly 10 could well have been employed between the bearing assembly 12B and the housing 14B. The point is, that with one housing presenting a fixed shoulder, the adjusting assembly 10 may present an opposed shoulder means to permit selection of the desired end play or preload on both bearing assemblies 12A and 12B in the bearing set 12. As shown, then, the shoulders 21B and 22 may be opposed with the outer race 11B of the bearing assembly 12B abuttingly engaging the shoulder 22 in the housing 14B and with the inner race 16B abutting the shoulder 21B on the shaft 13.

Similarly, the inner race 16A on the bearing assembly 12A will engage the shoulder 21A on the shaft 13, but the outer race 11A will engage the adjusting assembly 10. Unlike the arrangement shown and described with respect to housing 14B, however, it should be noted that there need be no shoulder on the housing 14A which corresponds to the shoulder 22 on housing 12B.

A first ring 25 may be incorporated in the adjusting assembly 10, and the first ring 25 will have oppositely directed end walls. The first end wall on the first ring 25 may be a planar driving wall 26 that is preferably disposed transversely with respect to the longitudinal axis 27 of the shaft 13 to engage the opposed planar end wall 28 on the outer race 11A of the bearing assembly 12A. The second end wall 29 on the first ring 25 comprises a ramp means, the purpose of which, and a typical construction for which, will be hereinafter more fully described.

A tang 30 extends radially outwardly from the first ring 25 to be slidable within an axially oriented slot 31 which extends radially outwardly from the aperture 15A circumscribed by the housing 14A within which the bearing assembly 12A is received. As such, the interaction of the tang 30 within the slot 31 precludes rotation of the first ring 25 with respect to the housing 14A but permits axial translation of the first ring 25 within the aperture 15A.

A second ring 35 is also incorporated in the adjusting assembly 10, and the second ring 35 also has oppositely directed end walls 36 and 38, but the second ring 35 is rotatably received within the aperture 15A. The first end wall 36 on the second ring 35 comprises a ramp means which is contiguously juxtaposed against the ramp means presented from the second end wall 29 on the first ring 25 to interact cooperatively therewith. One or more tabs 39 extend radially inwardly from the second ring 35 to allow some means by which one can engage the second ring 35 to effect selective rotation thereof, also for a purpose hereinafter more fully described. The second end wall 38 on the second ring is preferably transversely planar to simplify the engagement thereof with a planar latch plate 40.

A tang 41 extends radially outwardly from the latch plate 40 to be received within the axially extending slot 31 in the housing 14A. As such, the interaction of the tang 41 within the slot 31 grounds the latch plate 40 to the housing 14A and thereby precludes rotation of the latch plate 40 with respect to the housing 14A. A retaining device in the form of a C-ring 42 may be received within an annular slot 43 which circumscribes the aperture 15A. As such, when the C-ring 42 is received within the annular slot 43 the first ring 25, the second ring 35 and the latch plate 40 are secured between the outer race 11A of the bearing assembly 12A and the C-ring 42.

A locking means 45 is operative between the latch plate 40 and the second ring 35. Specifically, a plurality of locking pawls 46 extend radially inwardly from the latch plate 40 to be selectively engageable with interdental receiving recesses 48 on the second ring 35.

Figure 3:
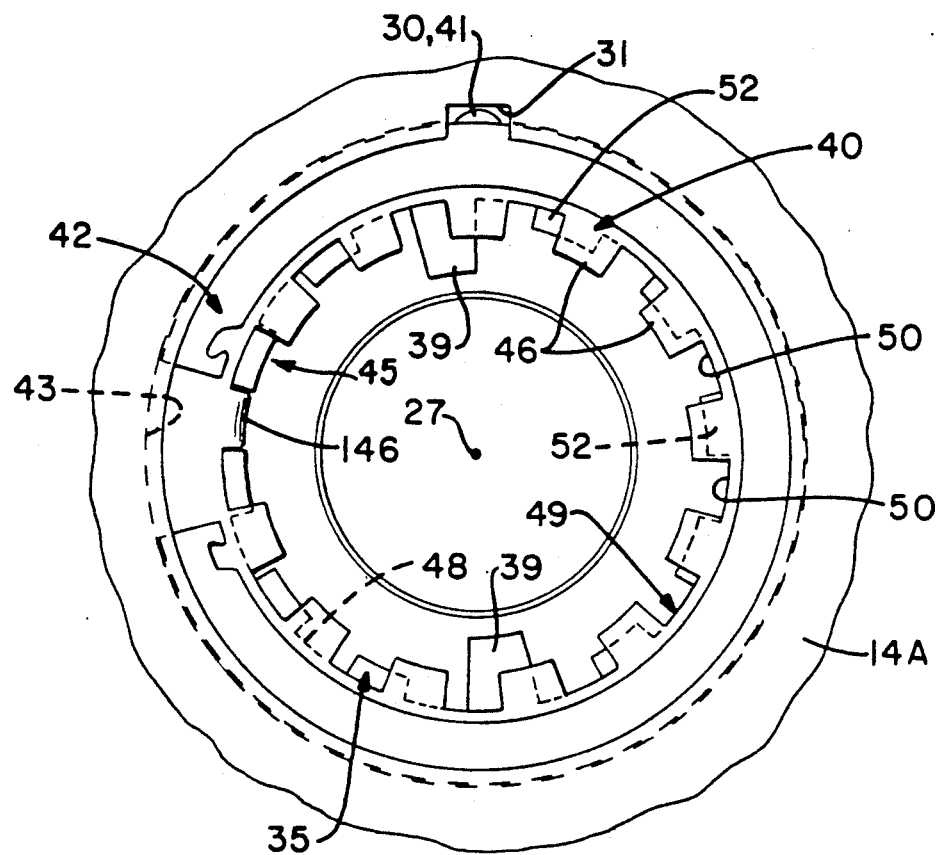
FIG. 3 is an enlarged end elevation, partly broken away, depicting the right end of the structure depicted in FIG. 1.

In order to effect selective locking of the second ring 35 at incremental angular displacements, the components of the locking means 45 will preferably be disposed in what is herein designated as a vernier arrangement. An exemplary embodiment of a vernier locking arrangement is best depicted in FIG. 3. Thirteen locking pawls 46 may be presented from the latch plate 40 to be spaced at equal circumferential intervals along the radially inner edge portion 49 of the annular latch plate 40. With the thirteen locking pawls 46 spaced at equal circumferential intervals, the thirteen gaps 50 therebetween are also spaced at equal circumferential intervals, in which situation the combined thirteen locking pawls 46 and gaps 50 will each subtend approximately 13.89 degrees.

To complete the vernier arrangement, the second ring 35 will present one lesser number of interdental receiving recesses 48 than there are locking pawls 46. As such, in the representative embodiment described herein, there will be twelve interdental receiving recesses 48. The twelve interdental receiving recesses 48 will also be spaced at equal circumferential intervals along the radially inner edge of the second ring 35. However, in order to be assured that when a locking pawl 46 is captured within a receiving recess 48, no relative rotation will be available between the second ring 35 and the latch plate 40, each interdental receiving recess 48 will also subtend approximately 13.89 degrees. As such, when any of the locking pawls 46 are closely embraced by any of the interdental receiving recesses 48, "backlash" or relative movement between the second ring 35 and the latch plate 40 is precluded.

On the other hand, the twelve blocking teeth 52 which extend between the interdental receiving recesses 48 will, compositely, utilize the remainder of the circumferential span of the second ring 35. That is, the composite span of the twelve blocking teeth 52 will extend a total of approximately 193.34 degrees. The twelve blocking teeth 52 between each interdental receiving recess 48 will, therefore, each subtend 16.11 degrees. Because of the aforesaid vernier arrangement, the second ring 35 must be rotated approximately 2.22 degrees to effect engagement of a sequential locking pawl 46 with a sequential interdental receiving recess 48.

Because of the contiguous juxtaposition of the opposed ramp means 29 and 36, rotation of the second ring means 35 will effect axial translation of the first ring means 25. One can, therefore, predetermine the extent of axial translation imparted to the first ring means 25 in response to incremental rotation of the second ring means 35. In the exemplary embodiment depicted, therefore, should one choose to effect, for example, a 0.002 inch axial displacement of the first ring 25 in response to engagement between each successive locking pawl 46 and a successive interdental receiving recess 48, one establishes a 0.002 inch throw as a result of the combined pitch of the opposed ramp means 29 and 36 in response to an angular displacement of 2.22 degrees.

Figure 4:
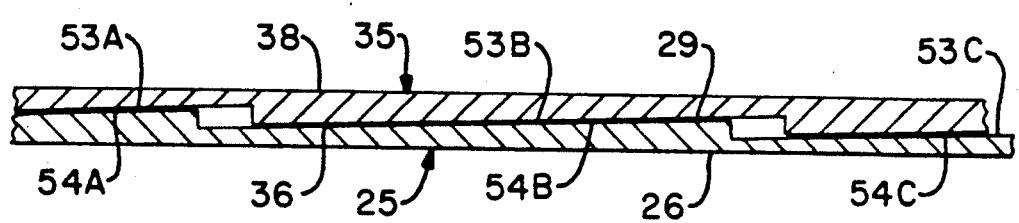
FIG. 4 is a partial circumferential section which depicts the contiguously juxtaposed ramp means interactive between the first and second ring means by which to effect axial translation of the one with respect to the other.

One may provide a single, continuously inclined ramp surface on each ring means 25 and 35, or because of the limited displacement required for the full range of movement anticipated, the opposed ramp means 29 and 36 may be divided into a plurality of individual ramp surfaces 53A, 53B and 53C, as well as 54A, 54B and 54C, extending in sawtooth fashion around the circumference of the respective ring means 25 and 35, a portion of which is depicted in FIG. 4.

It should, therefore, be apparent to one skilled in the art that the plurality of ramp surfaces 53 and 54 could be selected in combination with the pitch thereof in order to provide the desired adjustment for a particular bearing arrangement.

One final improvement resulting from the aforesaid arrangement is in the method which may be employed to manufacture the ring means 25 and 35. The cost of cutting ramp surfaces can be quite expensive. However, powdered metal technology permits the rings 25 and 35 to be formed instead of cut. That is, by employing powdered metal technology, the first and second rings 25 and 35 can be formed quite precisely by sintering the powder into a solid uniform piece.

Recapitulation

Tapered bearings, either individually or in a set, are employed in many applications where both radial and thrust loading may be applied. According to the concept of the present invention, the bearing assemblies are axially restricted by means of at least one fixed shoulder and an effective movable shoulder provided by the adjusting assembly 10.

The present invention will act to replace the prior art shim pack, cover and seal used to adjust tapered bearing assemblies. The latch plate 40 of the present invention will secure the rotatable second ring means 35 in position with no possibility of creep while still providing the fine adjustments to the preloading and end play of an individual tapered bearing assembly, or a tapered bearing set 12.

As the second ring means 35 is rotated, the opposed ramp surfaces 53 and 54 interact to displace or translate the first ring means 25 along the axis 27. The axial displacement of the first ring means 25 will increase or decrease the preload and end play on the bearing set 12, depending upon the direction in which the second ring means 35 is rotated. Once the axial distance through which the first ring means 25 is displaced for each incremental degree of angular rotation by the second ring means 35 is determined, the need to measure, as required when installing shims, is eliminated. In addition, shims do not need to be selected or stocked inasmuch as the two contiguously juxtaposed ramp surfaces 53 and 54 effectively substitute in minute increments for whatever shims would have been required.

The foregoing final adjustment is normally achieved by rotating the second ring 35 to exceed the required preload. In this manner one can assure that the bearing assembly or set is properly seated in the housing, and that the grease is squeezed into the interstices between the tapered rollers 18 and the races 11 and 16. Thereafter, the preload is reduced to establish the required end play. At that point the second ring 35 must be secured or grounded. That is, when the second ring 35 has been rotated to position the first ring 25, such that the desired preload and end play is achieved, one of the locking pawls 46 will be virtually aligned with one of the interdental receiving recesses 48. As soon as that pawl is bent into the aligned recess 48, as represented by pawl 146 in the drawings, the second ring means 35 is effectively grounded to the housing 14 through the latch plate 40. Because the locking pawl 146 is closely embraced by the receiving recess 48, the latch plate 40 will secure the second ring means 35 in position with no possibility of creep while nevertheless providing a structure by which fine adjustment of the preload and end play has been achieved.

Thus, it should be apparent that a system embodying the concepts of the present invention effectively secures the desired end play for a tapered bearing. It should also be apparent to one skilled in the art, that the inclination of the ramp surfaces 53 and 54, as well as the size and number of the locking pawls 46 and the blocking teeth 52, may be varied to provide the particular axial translation of the first ring means 25 in response to a predetermined angular rotation of the second ring means 35 without departing from the spirit of the present invention.

As should now be apparent, the present invention not only provides a simplified assembly by which to effect incremental adjustments to the end play and preload of a bearing but also accomplishes the other objects of the invention.

The embodiments of the invention in which an exclusive property or privilege is claimed are defined as follows:

1. In combination with at least one bearing assembly supported within a housing means, an adjusting assembly, said adjusting assembly comprising: first and second ring means; means operative between said first ring means and the housing means to preclude rotation of said first ring means but to permit axial translation thereof; said second ring means being angularly rotatable with respect to said first ring means; a latch plate disposed in proximity to said second ring means; means operative between said latch plate and the housing to preclude rotation of said latch plate; means to retain said first ring means and said second ring means as well as said latch plate operatively disposed with respect to each other and said housing; said first and second ring means having opposed, interacting ramp surfaces such that angular rotation of said second ring means effects axial translation of said first ring means; vernier locking means incrementally interactive between said latch plate and said second ring means to secure said second ring means at selected increments of angular rotation.

2. In combination with at least one bearing assembly having an outer race, an assembly for adjusting the axial end play of, and the preload on, the outer race: housing means circumscribing an aperture adapted to receive the bearing assembly; an axially translatable, first ring means, nonrotatably received within said aperture; said first ring means having oppositely directed, first and second end walls; said first end wall on said first ring means engaging the outer race of the bearing assembly; said second end wall on said first ring means presenting a ramp means; a second ring means also received within said aperture; said second ring means having oppositely directed, first and second end walls; said first end wall on said second ring means presenting a ramp means which operatively engages the ramp means on said second end wall of said first ring means; retaining means to secure at least said first and second ring means within said aperture; said second ring means being rotatable with respect to said housing such that the interaction of said opposed ramp means effects axial translation of said first ring means to effect adjustment in the end play of the bearing race; and, locking means to secure said first ring means at predetermined incremental translations thereof.

3. A combination, as set forth in claim 2, wherein said locking means further comprises: a latch plate disposed in proximity to said second ring means and being nonrotatable with respect to said housing; a plurality of pawl means presented from said latch plate; a plurality of receiving means presented from said second ring means to engage said pawl means; said pawl means and receiving means being spaced in a vernier disposition to permit said second ring means to be secured at incremental degrees of angular rotation in order thereby to secure said first ring means at incrementally translated, axial locations.

4. A combination, as set forth in claim 2, wherein said locking means further comprises: a latch plate disposed between said second ring means and said retaining means; a plurality of pawl means presented from said latch plate at circumferentially spaced intervals; a plurality of receiving recesses provided from said second ring means at circumferentially spaced intervals to receive circumferential sequential pawl means; the circumferential spacing of said pawl means in relation to the circumferential spacing of said receiving recesses presenting a vernier disposition to permit said second ring means to be secured at incremental degrees of angular rotation in order thereby to secure said first ring means at incrementally translated, axial locations.

5. A combination, as set forth in claim 4, wherein: the number of pawl means exceeds the number of receiving means by at least one.

6. An assembly for selectively adjusting the end play of and/or the preload on a bearing assembly, said adjusting assembly being adapted to be interposed between a bearing assembly and a retaining means for said bearing assembly, said adjusting assembly comprising: a first ring means; and first ring means being adapted to be interposed between said bearing assembly and said retaining means; a second ring means; said second ring means being adapted to be rotatably interposed between said first ring means and said retaining means; opposed and cooperative interacting ramp surfaces presented form said first and second ring means such that rotation of said second ring means effects axial translation of said first and second ring means; a latch plate disposed between said second ring means and said retaining means and vernier locking means incrementally interactive between said latch plate and said second ring means to secure said second ring means at selective increments of angular rotation.

7. An adjusting assembly, as set forth in claim 6, wherein said locking means further comprises: said latch plate being nonrotatably interposed between said second ring means and said retaining means; said vernier locking means comprising a plurality of interdental receiving recesses circumferentially spaced along said second ring means; a plurality of locking pawls extending radially from said latch plate for selective engagement with said interdental recesses; the circumferential spacing of said locking pawls with respect to said interdental recesses presenting a vernier disposition to permit said second ring means to be secured at incremental degrees of angular rotation in order thereby to secure said first ring means at incrementally translated, axial locations.

8. An adjusting assembly as set forth in claim 7, wherein said vernier disposition further comprises: a blocking tooth being interposed between each said successive interdental receiving recess; the circumferential span of each said blocking tooth in relation to the spacing between successive locking pawls being such that the vernier disposition is achieved.

9. An adjusting assembly as set forth in claim 8, wherein the number of locking pawls exceeds the number of said interdental recesses by at least one such that rotation of said second ring sequentially brings one locking pawl into alignment with one of said interdental recesses.

10. An adjusting assembly, as set forth in claim 9, wherein: said locking pawls are spaced at equal intervals circumferentially of said latch plate; said interdental recesses are also spaced circumferentially of said second ring means; a blocking tooth is interposed between successive interdental receiving recesses; the circumferential span of each said locking pawl is substantially equal to the circumferential span of said receiving recess such that each said receiving recess will embrace a locking pawl disposed therein; the circumferential span of said blocking teeth being greater than the spacing between said successive locking pawls by the difference in the composite circumferential span of the spacing between successive locking pawls which results by there being one lesser receiving recess on the second locking ring than there are locking pawls on said latch plate.

11. An adjusting assembly, as set forth in claim 10, further comprising: thirteen locking pawls; and, twelve receiving recesses.

* * * * *